Patented Apr. 21, 1942

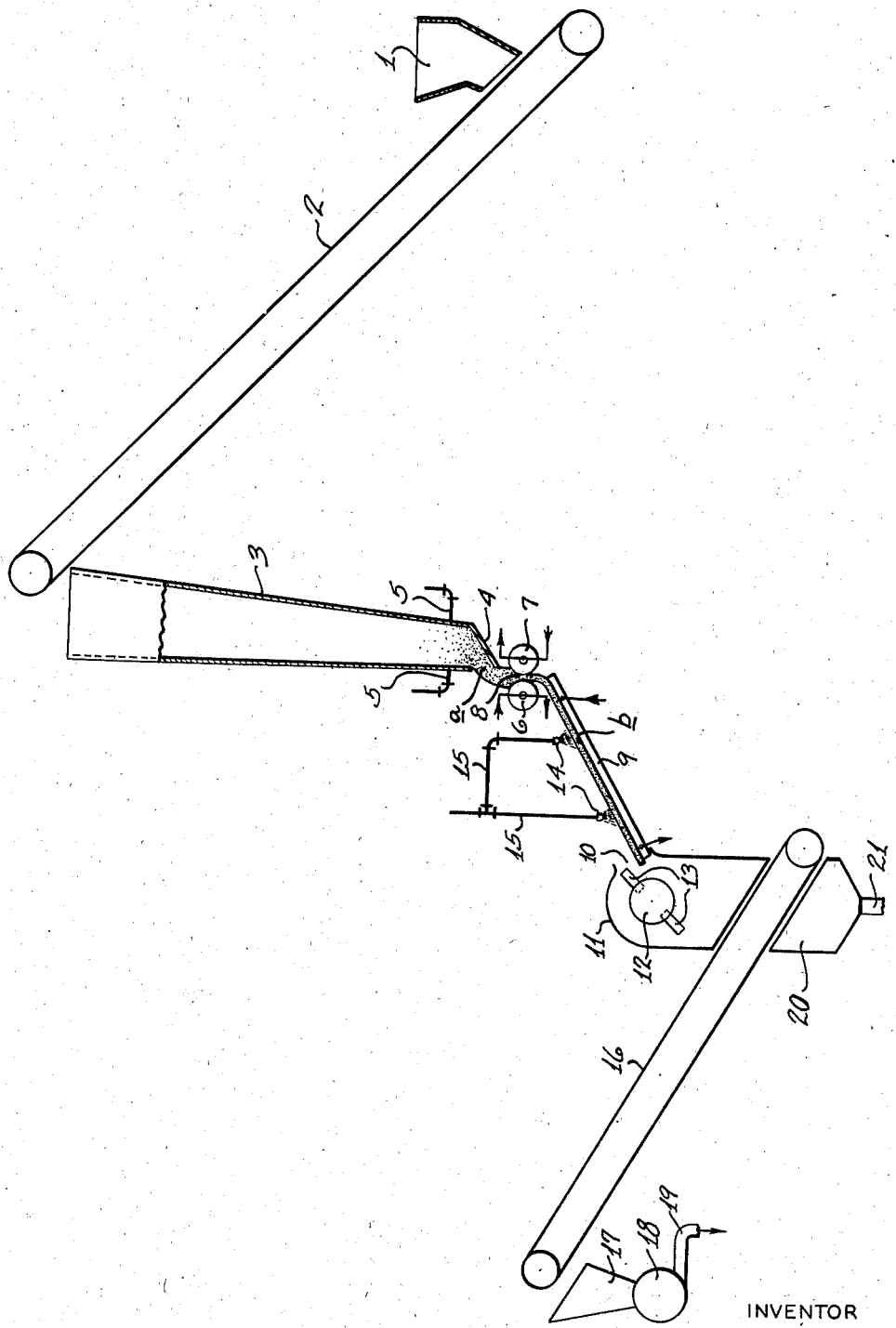

2,280,130

UNITED STATES PATENT OFFICE 2,280,130

PROCESS FOR MANUFACTURING FERTILIZER

Herman C. Reinders-Folmer, Norfolk, Va., assignor to Smith-Rowland Company, Inc., Norfolk, Va., a corporation of Virginia Application June 26, 1939, Serial No. 281,092

1 Claim. (Cl. 71—18)

This invention relates to a certain new and useful process and means for manufacturing fertilizer from waste materials and, more particularly, from proteinaceous waste materials, such as sole leather scrap and the like.

In the manufacture of fertilizer from waste materials of the class mentioned, the raw materials usually collected by various scavenging and refuse collector agencies will normally include an appreciable quantity of so-called vegetable tanned leather scrap, such, for instance, as sole leather from shoe factories. Such sole or other vegetable tanned leather scrap will, upon digestion, be hydrolyzed much more quickly than other types of waste material and produces a gummy viscous product, which tends to agglutinate the digested mass and thereby materially impede the digestion and further handling of the intermixed more slowly digestible waste materials.

Further, in the processing and digestion of mixed waste materials, it is necessary to hydrolyze the materials being treated for a sufficiently long period of time to break down the more slowly hydrolyzed constituents. This relatively prolonged period of hydrolysis will result in overhydrolyzing a substantial proportion of the sole or other vegetable tanned leather scrap, resulting in the production of an excessive quantity of more simple water soluble amino compounds which are relatively useless for agricultural purposes, thereby materially reducing the percentage of desirable water insoluble nitrogen in the fertilizer ultimately produced.

By reason of the fact that such sole leather scrap is of relatively high quality and also because the same actually complicates and interferes with the digestion and processing of other types of waste material, it is exceedingly desirable to segregate and separately process material of such type.

My present invention, hence, has for its primary objects the provision of a process and means for separately hydrolyzing waste materials of the class stated, which is exceedingly simple and economical, which is capable of substantial continuous operation, which may be precisely and accurately controlled, and which results in a maximum yield of high grade fertilizer having substantially high available water insoluble nitrogen content and light desirable color.

And with the above and other objects in view, my invention resides in the unique process and in the novel features of form, construction, arrangement, and combination of parts presently described and pointed out in the claim.

In the accompany drawing, the figure is a diagrammatic view of unique fertilizer processing apparatus of my invention for practicing the present process.

Referring now in more detail and by reference characters to the drawing, 1 designates an unloading hopper of any conventional type preferably positioned adjacent a car-unloading platform for receiving the sole or other like leather scrap and discharging the same onto a conveyor 2 preferably, though not necessarily, of the continuous belt or drag link type, which extends angularly upwardly and discharges at its upper end into a tall open-topped digestion or hydrolysis column 3 constructed preferably of heavy sheet metal or other suitable material and having a slight converging taper from top to bottom and provided at its lower end with an inclined or oblique discharge plate 4.

Adjacent its lower extremity and suitably spaced from the discharge plate 4, the digester column 3 is provided with a plurality of annularly spaced tuyère-like steam nozzles 5, each at its inner end opening into the digester column 3 and, at its outer end, connected to a suitable source of high-pressure steam (not shown).

Mounted for rotation beneath the lower end portion of the oblique discharge plate 4, as shown, is a pair of parallel horizontally disposed water-cooled rolls 6, 7, rotatable in opposite directions and shiftably adjustable toward and from each other in any conventional manner in the provision of a variable lateral gap 8. Having its upper end disposed directly beneath the gap 8 and extending angularly downwardly from the rolls 6, 7, is a water-cooled table 9 having a transverse width somewhat greater than the axial length of the rolls 6, 7, and terminating at its lower end over the intake opening 10 of a beater shell 11 rotatably provided with a beater drum 12 having a plurality of radially outwardly extending beater hammers 13.

Operatively mounted over the table 9 at various locations spaced longitudinally therealong, is a series of cold-spray nozzles 14 conventionally connected through pipe lines 15 to any suitable source of cold water supply (not shown).

Extending through the lower portion of the beater shell 11 and spaced downwardly from the beater drum 12, is an obliquely upwardly disposed conveyor 16 preferably, though not necessarily, of the continuous or drag link type, at its upper end discharging into the hopper 17 of a conventional comminutor 18, in turn, discharging through a duct 19 to a conventional type of dryer (not shown).

At its lower extremity, the beater shell 11 is provided with a catch basin 20 discharging into a conventional drain pipe 21 for leading off excess water flowing into the shell 11 from the spray nozzles 14, and it may also be pointed out in this connection that the conveyor 16 may preferably be formed of a suitable foraminous material so as to permit free drainage of water from the flaked or broken down material particles.

The sole or other similar leather scrap is discharged from the hopper 1 upon the conveyor 2 and transported upwardly into and gradually filling the digester column 3. When the digester column 3 is filled approximately to its top, high-pressure steam is admitted through the tuyere-like nozzles 5 and passes upwardly through the interstices of the mass of scrap being treated in the digester column 3. Since the digester column 3 is open to atmospheric pressure and is relatively tall, the entering steam will substantially expend its entire heat and force in the lower regions of the digester column 3, immediately hydrolyzing the leather scrap at the lower portion of the column 3 in the production of a thick gummy or viscous mass $a$, which runs downwardly over the discharge plate 4 into, and by the rotating water-cooled rolls 6, 7, and is squeezed through, the gap 8. From the gap 8, the mass issues upon the oblique water-cooled table 9 in a wide thin sheet $b$, which slides slowly down over and upon the upper face of the table 9 beneath, and is chilled by the cold water spray discharging from the nozzles 14, the viscous mass $a$ being chilled and the progressive hydrolytic action being substantially arrested.

As the viscous mass $a$ flows downwardly out of the digester column 3, the unhydrolyzed mass of scrap will gradually settle downwardly through the digester column 3 and eventually move into the zone of the steam jets 5, where hydrolysis will take place. Thus it will be evident that, by continuously charging the raw scrap into the top of the digester column 3, the stream of the viscous hydrolyzed material $a$ will flow continuously out of the digester column 3 through the gap 8 between the water-cooled rolls 6, 7, so that the sheet $b$ of hydrolyzed material, moving across the upper face of the inclined table 9, will also be continuous.

The sheet $b$ of hydrolyzed material, moving downwardly over the table 9 beneath the spray nozzles 14, is chilled and hardens, becoming very brittle, and is broken up into relatively small flakes or chips as it moves off of the lower end of the table 9 through the intake opening 10 of the beater shell 11 and into the path of the rapidly rotating beater hammers 13.

The thus flaked or chipped material drops downwardly through the beater shell 11 onto the conveyer 16 and is transported upwardly into the hopper 17 of the comminutor 18, wherein it is ground or pulverized to any desired degree of fineness in the production of fertilizer. The pulverized or ground fertilizer is then discharged from the comminutor 18 through the discharge duct 19 to any suitable dryer for final drying and is thence conventionally ground, screened, and stored until shipment.

Thus, by my present invention, I provide a process and means for the continuous production from sole leather and other heavy leather scrap of a fertilizer of exceptionally satisfactory color and available water insoluble nitrogen content. In addition, my present process is exceedingly economical in operation and results in a high, uniform yield.

It should be understood that changes and modifications in the several process steps and in the form, construction, arrangement, and combination of the several parts of the apparatus for manufacturing fertilizer may be made and substituted for those herein shown and described without departing from the nature and principle of my invention.

Having thus described my invention, what I claim and desire to secure by Letters Patent is:

The process of producing fertilizer from proteinaceous material capable of progressive hydrolytic degeneration which comprises feeding the proteinaceous material at atmosperic pressure into a zone of live steam in which the proteinaceous material will become progressively more fluid as the hydrolytic reaction proceeds, permitting the hydrolyzing proteinaceous material to flow out of the steam zone when it reaches a viscosity such that it will flow under its own weight, passing the outflowing hydrolyzed material between water cooled rolls to cool the mass and form it into a thin sheet thereby arresting further hydrolytic degeneration of the proteinaceous material further cooling the sheet to render it substantially brittle, breaking the sheet into large particles, and then grinding the particles to form fertilizer.

HERMAN C. REINDERS-FOLMER.